United States Patent Office 3,642,912
Patented Feb. 15, 1972

3,642,912
ALKYLATION OF PHENOLS
John Alan Sharp and Raymond Ernest Dean, Bradford, England, assignors to The Coal Tar Research Association, Yorkshire, England
No Drawing. Filed Dec. 11, 1967, Ser. No. 689,275
Int. Cl. C07c 37/16
U.S. Cl. 260—621 R
4 Claims

ABSTRACT OF THE DISCLOSURE

Titanium dioxide is used to catalyse the reaction between at least one alcohol and at least one phenol in the vapor phase, so as to give alkylphenols. The temperature range preferred for the reaction is about 250° C. to about 500° C. The reaction can be carried out in a fluidized bed reactor.

---

This invention relates to the preparation of alkylphenols by the reaction of at least one alcohol with at least one phenol, in the vapor phase.

One example of known processes for the preparation of alkylphenols is the methylation of phenols with methanol in the presence of metal oxide catalysts. Some of these catalysts (for example, alumina) exhibit a high ortho-selectivity; and, under suitable conditions, give good yields of orthocresol, with very little of the meta- or para-isomers. With such catalysts, however, appreciable quantities of 2,6-xylenol are almost invariably produced, even at low conversions of phenol. At high conversions of phenol, the amount of 2,6-xylenol can even exceed the amount of o-cresol produced; and, in addition, substantial quantities of unwanted tri- and tetra-methylphenols are formed in the reaction. Other metal oxide catalysts (for example, silica/alumina), although giving ortho-cresol as the major product, tend in addition to give a wide range of more highly methylated phenols, which thus reduces the usefulness of the process.

It is a feature of the present invention that when active forms of titanium dioxide are used as the catalyst, under suitable conditions, ortho-cresol is the major product formed but instead of 2,6-xylenol the by-products consist mainly of p-cresol and 2,4-xylenol together with a smaller quantity of meta-cresol. p-cresol and 2,4-xylenol are particularly useful as starting materials for the production of valuable antioxidants.

The invention consists in a method for the preparation of alkylphenols by the vapor phase reaction of an alcohol with at least one phenol in the presence of at least one titanium dioxide catalyst.

The invention is especially advantageous when applied to aliphatic alcohols having a small number of carbon atoms; and methanol and ethanol are the alcohols particularly preferred. The preferred phenols for use in the present invention are those having a hydrogen atom in at least one of the ortho-positions and also a hydrogen atom in the para-position, such as phenol itself (i.e. monohydroxybenzene).

The alkylation reaction may be carried out at sub-atmospheric, atmospheric or super-atmospheric pressures.

Titanium dioxide exists in several forms, of which octahedrite or anatase and rutile are the principal modifications; and active catalysts have been prepared from both forms. Although surface area is important, the method of catalyst preparation seems at least of equal significance, catalysts prepared from a gel form of the hydrated oxide usually being more active than crystalline material.

A particularly active catalyst may be prepared by hydrolysing an ethanolic solution of titanium tetrachloride with dilute ammonium hydroxide. The gel which is thus obtained is washed with water, filtered off, dried at about 100° C. and then calcined at about 500° C. for 4 hours. The dried and calcined gel can be broken down into granules which can be directly used as catalyst or the gel can be extruded into suitably sized pellets. As a further alternative an inert support can be employed. Thus pumice particles can be first soaked in an ethanolic solution of titanium tetrachloride, drained and then washed with dilute ammonium hydroxide, washed with water, dried and calcined.

Certain forms of commercially available titanium dioxide are also suitable as catalysts for the process of the invention. The slurry of hydrated titanium oxide known as "Precalciner Pulp" on drying and calcination as above and granulated, or pelleted before calcination or dried in the presence of an inert support such as pumice and the resultant particles dried and calcined, yields active catalysts, although such catalysts are less active than that derived as above from titanium tetrachloride and require somewhat higher reaction temperature to give the same conversion levels.

The reaction may be carried out in the conventional type of tubular or multitubular reactor used for vapor phase reactions over a particulate solid catalyst. Alternatively a fluid bed reactor may be used and, in this case, a particularly suitable form of catalyst consists of titanium dioxide in the form of microspheres prepared by spray drying a titanium hydroxide sol.

The reaction between methanol and phenol is exothermic and it is preferable to preheat the reactants before they enter the catalyst chamber to a temperature somewhat below that required for the reaction. The heat generated by the reaction will then raise the catalyst bed to the desired temperature. To maintain the temperature at this level it may be necessary, depending on the design of the reactor, to supply some additional heat directly to the reactor, either by passing or circulating a gas or liquid on the outside of the tubes holding the catalyst, or by heating the external circumference of the reactor electrically; or, on the contrary, it may be desirable to abstract heat from the reactor by circulating a suitable gaseous or liquid cooling medium on the outside of the catalyst tubes.

Titanium dioxide catalysts can maintain their activity for prolonged periods. Thus, in one experiment of 420 hours duration, the o-cresol content of the reaction product remain fairly constant for 300 hours and then began to fall away slightly. This fall-off could be offset by raising the temperature. Since the proportion of phenol consumed decreased during the course of the experiment as did the amount of methyl phenols other than o-cresol in the product, the overall effect was one of increasing orthoselectivity. The decline in activity is due to deposition of carbon on the catalyst surface and the activity can be restored to its original level by passing a stream of air through the catalyst bed heated to about 420° C. at such a rate that the catalyst bed temperature does not exceed about 500° C.

The methanol and phenol can be mixed together and the resultant solution vaporised and preheated before contacting the catalyst; or, alternatively, the two streams can be vaporised separately and preheated either separately or together before they enter the reactor. The product vapors can be cooled and condensed in a suitable system and the components separated by fractional distillation or other suitable means. Any unchanged methanol, unreacted phenol and anisole can be recycled.

The process according to the present invention is preferably carried out at catalyst temperature in the range of about 250–500° C. Thus the higfhly active form of titanium dioxide mentioned above was reasonably active at 300° C. and with this particular catalyst the preferred range was about 30–350° C. with the optium temperature being about 330° C. On the other hand one of the commercial samples of titanium dioxide was almost completely inactive in this temperature range but gave useful results at a temperature of about 450° C.

The molar ratio of alcohol to phenol can be varied quite widely: for example, the most useful results for reactions using methanol have been obtained at methanol: phenol ratios between 0.5 to 1 and 2 to 1. Contact times as low as 1 second and as high as 20 seconds and over can be employed in such reactions.

The effects of variations in the molar ratio of methanol to phenol and in contact time and temperature on the constitution of the product are to a very large extent inter-related. When methanol and phenol in the molar ratio of 0.5 to 1.0 are used as reactants conversions are below 40%.

Thus when such a feedstock is passed through the catalyst bed maintained at a temperature of 330° C. at a contact time of 10 seconds, 27% of the phenol is converted giving yields of 47% o-cresol, 8% m-cresol, 27% p-cresol, 10% 2,4-xylenol and 6% anisole (expressed as mole —percent yields of the phenol converted. Raising the molar ratio of methanol to phenol to equimolar proportions increases the conversion of phenol to 38% with mole —percent yields of 51% o-cresol, 7% m-cresol, 18% p-cersol, 13% 2,4-xylenol and 8% anisole. There is usually present in the product small quantities, usually less than 1% of methylanisoles. Increasing the temperature or the contact time also has the effect of increasing the conversion. When a low ratio of methanol to phenol is used, for example 0.5 to 1.0, this has little effect on the product distribution. With a feedstock consisting of equimolar parts of methanol and phenol increasing the contact time or temperature causes the appearance in the product of xylenols other than the 2,4-isomer, particularly 2,6-xylenol. This effect is aggravated when methanol to phenol ratios of greater than unity are used. Under such conditions up to 90% of the phenol is converted and although o-cresol is still the main product, the proportion of 2,6-xylenol in the product increases until the quantity formed is approximately equal to that of the 2,4-isomer. Other xylenols, tri- and tetra-methylphenols are also produced. Under extreme conditions, for example when using a feedstock in which 3 moles of methanol are reacted with 1 of phenol with long contact times of 20 seconds and over at high temperature, almost all the phenol is converted but the major products are then 2,6-xylenol, 2,4,6-trimethyl phenol and 2,3,4,6-tetramethylphenol, with lesser quantities of their isomers. A small quantity only of o-cresol is produced under such conditions, with negligible amounts of m- and p-cresol.

It will thus be seen that a particularly advantageous application of this invention is realised by reacting methanol with phenol under those conditions which give high yields of o-cresol, p-cresol and 2,4-xylenol based on the phenol consumed.

The effects of the operating conditions on the nature of the products are more precisely illustrated by and described in the following examples, which show how the invention may be carried into effect. Unless otherwise specified, all the percentages given are by weight.

EXAMPLE 1

A vertical glass tube of 1 inch internal diameter was packed at the lower end with inert ceramic beads. Above this was placed a bed of 3/16″ x 3/16″ cylindrical pellets prepared from a commercially available titanium dioxide (Catalyst A), the upper section of the reactor being packed with a further layer of ceramic beads. A glass thermowell pan down the long axis of the reactor, the whole system being jacketed by an electrically heated mild steel tube.

A solution of phenol in an equimolar amount of methanol was pumped into the top of the reactors where it vaporised on the inert bead packing. The vapors then passed downwards over the bed of the catalyst, the product then passing over the lower packing of inert beads and into the receiver and condenser system.

The feed rate of the phenol/methanol solution was adjusted to give a 10 second contact time between the reactants and the catalyst.

The products which collected in the receiver were diluted with benzene and the solution was dried over anhydrous calcium sulphate then analysed by known means. Two experiments were performed with Catalyst A, using catalyst temperatures of 330° C. and 450° C. respectively. Experimental details are given in Table 1.

A second catalyst (Catalyst B) was prepared by the hydrolysis of an ethanolic solution of titanium tetrachloride by ammonium hydroxide, the resultant gel being washed, dried and calcined at 500° C. then crushed and sieved to give granules of 8–16 B.S. mesh. This catalyst was used in a third experiment in the above apparatus, the experimental details and analysis results being given in Table I.

Examination of Table I shows that whilst the commercial titanium dioxide (Catalyst A) has useful properties at 450° C. a more active catalyst is that obtained by the controlled hydrolysis of titanium tetrachloride (Catalyst B). The latter material is more active at 350° C. than is Catalyst A at 450° C.

TABLE I

| Catalyst reference | A | A | B |
|---|---|---|---|
| Catalyst temperature (° C.) | 330 | 450 | 330 |
| Weight of phenol/methanol fed (g.) | 46.4 | 19.3 | 45.8 |
| Weight of liquid products (g.) | 45.1 | 17.6 | 43.3 |
| Constitution of phenol-based products (percent): | | | |
| Anisole | 8.5 | 0.8 | 3.0 |
| Phenol plus o-methylanisole | 78.9 | 64.3 | 36.6 |
| m-/p-Methylanisole | | | 1.2 |
| o-Cresol | 10.8 | 24.5 | 24.2 |
| m-Cresol | | 2.7 | 3.5 |
| p-Cresol | 1.8 | 4.3 | 8.2 |
| 2,5-xylenol | | | 1.3 |
| 2,4-xylenol | | 1.6 | 11.9 |
| 2,6-xylenol | | 1.9 | 2.9 |
| 2,3-xylenol | | | 1.4 |
| 3,4-xylenol | | | 2.1 |
| 2,4,5-trimethylphenol | | | 1.9 |
| 2,4,6-trimethylphenol | | | 1.8 |

EXAMPLE 2

An experiment was performed in which the reactor described in Example 1 was charged with a catalyst (Catalyst C) prepared in the form of 3/16″ x 3/16″ cylindrical pellets from a commercially produced titanium dioxide pigment intermediate essentially in the anatase form. The feed to the reactor was a solution of phenol in methanol in 1:1.5 molar ratio, the feed rate being adjusted to give a contact time of 10 seconds with the catalyst temperature at 330° C. The duration of the experiment was 420 hours, the product being collected in separate portions every three hours and analysed by known means. The fluctuation of the composition of the phenol-based products during this experiment is shown in the following table.

TABLE II

| Time elapsed (hrs.) | 3 | 6 | 12 | 24 | 48 | 96 | 204 | 300 | 396 | 420 |
|---|---|---|---|---|---|---|---|---|---|---|
| Analysis of phenol-based product (percent): | | | | | | | | | | |
| Anisole | 4.4 | 5.7 | 4.7 | 5.5 | 4.7 | 3.5 | 3.5 | 2.6 | 2.5 | 2.5 |
| Phenol plus o-methylanisole | 49.6 | 40.9 | 40.4 | 50.7 | 49.8 | 53.8 | 55.4 | 62.2 | 69.3 | 70.0 |
| m-/p-Methylanisoles | 1.1 | 0.9 | 1.0 | 1.0 | 1.0 | 0.8 | 0.8 | | | |
| o-Cresol | 27.8 | 27.2 | 24.5 | 24.2 | 24.9 | 25.2 | 25.3 | 26.6 | 19.9 | 20.0 |
| m-Cresol | 3.3 | 4.1 | 3.7 | 3.9 | 3.8 | 2.8 | 2.8 | | 1.5 | 2.2 |
| p-Cresol | 5.0 | 5.8 | 6.1 | 7.0 | 6.3 | 5.2 | 4.8 | 4.1 | 2.3 | 2.6 |
| 2,5-Xylenol | 1.4 | 1.8 | 1.8 | 0.9 | 0.9 | 1.2 | 1.0 | | 1.3 | |
| 2,4-Xylenol | 5.4 | 7.7 | 7.4 | 4.7 | 5.2 | 3.7 | 3.4 | 2.0 | 1.7 | 1.3 |
| 2,6-Xylenol | 2.1 | 4.1 | 3.9 | 1.9 | 2.4 | 1.4 | 2.3 | 2.5 | 1.5 | 1.3 |
| 2,3-Xylenol | | 1.5 | 2.2 | | 1.0 | 1.3 | 0.6 | | | |
| 3,4-Xylenol | | | 1.4 | | | 0.9 | | | | |
| 2,4,5- plus 2,4,6-trimethylphenols | | | 3.0 | | | | | | | |
| Average catalyst temperature over sampling period (° C.) | 318 | 330 | 333 | 330 | 334 | 332 | 330 | 328 | 324 | 328 |

As indicated by the above results, the activity of this particular catalyst began to deteriorate after 300 hours, but it was found that the effect on the product composition could be offset by an increase in the catalyst temperature. Thus, when after 420 hours, the catalyst temperature was raised to 340° C., phenol-based products containing 26.5% o-cresol were obtained. The recovery of feed as liquid products over the experiment was 99.5%.

When the catalyst from this experiment was examined it was found to have collected carbon. The deposited carbon was removed by heating the catalyst in the reactor to 450° C. and passing air over it at 2 litres per litre of catalyst per min. for 24 hours, during which time a hotspot of maximum temperature 490° C. travelled down the catalyst bed.

The reactor charged with the reactivated catalyst was heated to 330° C. and a further methylation experiment was performed to evaluate the activity of the catalyst after revivification. The procedure used was similar to that described above, but the experiment was terminated after 60 hours although little fall-off in the catalyst activity was observed. The products were collected hourly over the first six-hours and then every three hours thereafter. The composition of the phenol-based products at selected intervals are given in the following table.

TABLE III

| Time elapsed (hrs.) | 1 | 2 | 6 | 12 | 24 | 48 | 60 |
|---|---|---|---|---|---|---|---|
| Analysis of the phenol-based products (percent): | | | | | | | |
| Anisole | 8.7 | 5.8 | 6.1 | 6.0 | 5.3 | 5.8 | 5.5 |
| Phenol plus o-methylanisole | 46.9 | 56.3 | 56.5 | 54.7 | 59.2 | 52.9 | 58.5 |
| m-/p-Methylanisoles | 1.1 | 0.6 | 0.9 | 0.7 | 0.4 | 0.4 | Trace |
| o-Cresol | 24.3 | 23.8 | 23.7 | 23.7 | 22.6 | 22.4 | 22.0 |
| m-Cresol | 1.5 | 1.5 | 1.2 | 1.7 | 1.0 | 1.2 | 0.9 |
| p-Cresol | 6.8 | 4.3 | 5.0 | 5.4 | 4.8 | 6.2 | 5.0 |
| 2,5-xylenol | 1.4 | 1.2 | 0.9 | | 0.8 | 1.1 | 0.4 |
| 2,4-xylenol | 6.3 | 4.7 | 4.0 | 5.2 | 4.2 | 5.0 | 3.8 |
| 2,6-xylenol | 0.9 | 1.0 | 1.7 | 1.2 | 1.0 | 2.4 | 1.6 |
| 2,3-xylenol | 0.9 | 0.7 | | | 0.5 | 1.9 | 0.9 |
| 3,4-xylenol | 1.0 | | | 1.3 | | 0.8 | 1.2 |

The recovery of feed as liquid products over this experiment was 95.9%.

EXAMPLE 3

A catalyst (Catalyst D) in the form of 3/16" x 3/16" cylindrical pellets was prepared from the products of the alkaline hydrolysis of titanium tetrachloride. This catalyst was used in the reactor described in Example 1, and an experiment performed using a molar ratio of methanol to phenol of 3:1 with a contact time of 20 seconds at a catalyst temperature of 350° C. The products of the reaction obtained in 92.8% recovery were dissolved in benzene and dried azeotropically. The phenol-based products obtained by distillation of the benzene were analysed by known means and found to contain: Anisole 0.7, phenol 1.4, m-/p-methylanisoles 0.2, o-cresol 7.2, m-cresol 0.2, p-cresol 0.8, 2,5-xylenol 2.4, 2,4-xylenol 6.9, 2,6-xylenol 20.0, 2,3-xylenol 1.8, 3,4-xylenol 1.5, 2,3,5-trimethylphenol 2.5, 2,4,5 - trimethylphenol 3.1, 2,4,6-trimethylphenol 22.6, 2,3,6-trimethylphenol 6.8, 2,3,4-trimethylphenol 2.9, 2,3,5,6-tetramethylphenol 1.2, 2,3,4,5-/2,3,4,6 - tetramethylphenols 12.9, and other unidentified components totalling 5.0%.

EXAMPLE 4

A block of experiments (Runs 1–4, Table IV) were performed in the reactor described in Example 1 using a fresh sample of the catalyst (Catalyst D) described in Example 3. In these four experiments the catalyst temperature was maintained at 330° C. whilst an equimolar mixture of methanol and phenol was pumped into the reactor at rates which gave effective contact times of 1, 5, 10 and 20 seconds respectively. The products were collected and analysed as in earlier examples.

TABLE IV

| Run Number | 1 | 2 | 3 | 4 |
|---|---|---|---|---|
| Catalyst temperature (° C.) | 330 | 330 | 330 | 330 |
| Molar methanol:phenol ratio | 1:1 | 1:1 | 1:1 | 1:1 |
| Contact time (sec.) | 1 | 5 | 10 | 20 |
| Recovery of liquid products (percent) | 97.5 | 98.9 | 95.7 | 96.2 |
| Analysis of phenol-based products (percent): | | | | |
| Anisole | 1.1 | 1.6 | 3.4 | 4.0 |
| Phenol plus o-methylanisole | 82.0 | 63.3 | 58.1 | 40.3 |
| m-/p-Methylanisoles | | | 1.9 | 1.2 |
| o-Cresol | 9.4 | 18.4 | 20.6 | 24.2 |
| m-Cresol | 1.4 | 3.5 | 2.7 | 3.6 |
| p-Cresol | 4.9 | 9.2 | 7.3 | 7.5 |
| 2,5-xylenol | | | | 1.4 |
| 2,4-xylenol | 1.3 | 4.0 | 5.9 | 8.7 |
| 2,6-xylenol | | | | 3.0 |
| 2,3-xylenol | | | | 1.2 |
| 3,4-xylenol | | | | 1.6 |
| 2,4,5-trimethylphenol | | | | 1.2 |
| 2,4,6-trimethylphenol | | | | 2.1 |

These results illustrate the effect of the contact time between the feed and the catalyst and show that although appreciable amounts of o-cresol are formed at 1 second contact time the yields are not commercially attractive, very much better results being obtained at 5 and 10 second contact times. On the other hand, the increase in the phenol conversion obtained by changing from 10 seconds to 20 seconds contact time is not accompanied by a proportionate increase in the o-cresol content and there seems to be little to be gained by any further increase in contact time over 20 seconds.

EXAMPLE 5

Two blocks of three experiments each were performed in the reactor described in Example 1, the catalyst used being a fresh sample of Catalyst D as described in Example 3. The purpose of these runs was to examine the effect of variations in the ratio of methanol and phenol on the composition of the products. The first group of three experiments was performed at a catalyst temperature of 330° C. with a contact time of 10 seconds using methanol:phenol molar ratios of 0.5:1.0, 1.0:1.0 and 2.0:1.0 respectively. In the second group the catalyst temperature was kept at 330° C. but with a contact time of 20 seconds using methanol:phenol molar feed ratios of 1.0:1.0, 2.0:1.0 and 3.0:1.0 respectively. Experimental details for these runs are given in Table V.

TABLE V

| Run Number | 1 | 2 | 3 | 4 | 5 | 6 |
| --- | --- | --- | --- | --- | --- | --- |
| Catalyst temperature (° C.) | 330 | 330 | 330 | 330 | 330 | 330 |
| Molar methanol:phenol ratio | 0.5:1.0 | 1.0:1.0 | 2.0:1.0 | 1.0:1.0 | 2.0:1.0 | 3.0:1.0 |
| Contact time (sec.) | 10 | 10 | 10 | 20 | 20 | 20 |
| Recovery of liquid products, percent | 100.0 | 95.7 | 97.0 | 96.2 | 94.4 | 95.4 |
| Analysis of phenol-based products, percent: | | | | | | |
| Anisole | 1.8 | 3.4 | 2.3 | 4.0 | 1.9 | 2.3 |
| Phenol plus o-methylanisole | 70.1 | 58.1 | 36.2 | 40.3 | 13.8 | 4.8 |
| m-/p-Methylanisoles | 0.9 | 1.9 | 0.5 | 1.2 | 0.7 | 0.7 |
| o-Cresol | 13.6 | 20.6 | 26.5 | 24.2 | 27.9 | 19.4 |
| m-Cresol | 2.4 | 2.7 | 3.8 | 3.6 | 0.7 | 0.4 |
| p-Cresol | 7.8 | 7.3 | 6.5 | 7.5 | 2.8 | 1.7 |
| 2,5-xylenol | | | 2.5 | 1.4 | 3.0 | 3.2 |
| 2,4-xylenol | 3.3 | 5.9 | 11.1 | 8.7 | 11.8 | 9.7 |
| 2,6-xylenol | | | 3.2 | 3.0 | 7.6 | 15.4 |
| 2,3-xylenol | | | 1.2 | 1.2 | 2.4 | 2.4 |
| 3,4-xylenol | | | 1.7 | 1.6 | 1.5 | 1.0 |
| 2,3,5-trimethylphenol | | | | | | 0.9 |
| 2,4,5-trimethylphenol | | | 2.4 | 1.2 | 4.9 | 5.3 |
| 2,4,6-trimethylphenol | | | 2.0 | 2.1 | 8.0 | 15.2 |
| 2,3,6-trimethylphenol | | | | | 3.3 | 5.1 |
| 2,3,4-trimethyl | | | | | 2.4 | 1.7 |
| 2,3,4,5-2,3,4,6-tetramethylphenols | | | | | 7.5 | 10.8 |

Although it is evident from the above results that high molar methanol:phenol ratios lead to higher conversions of phenol there appears to be little virtue in greatly exceeding the equimolar level if o-/p-cresols and 2,4-xylenol are the desired products since the enhanced conversions of phenol obtained by the use of high molar methanol:phenol ratios are accompanied by a disproportionate increase in the production of less useful phenols. This effect is particularly noticeable in the three runs performed with 20 second contact time where the 2,4-xylenol is gradually outstripped by the less desirable 2,6-isomer as the feed ratio of methanol:phenol is increased.

EXAMPLE 6

The effect of three levels of catalyst temperature at two levels of methanol:phenol feed ratio have been examined using the catalyst described in Example 3. The catalyst temperatures selected were 300°, 330° and 350° using molar methanol:phenol ratios of 0.5:1 and 1.0:1.0. All six runs were performed in the reactor described in Example 1, with a 10 second time of contact between the catalyst and the organic feed. The products were collected and worked-up as in previous examples. The relevant experimental details are given in Table VI.

it was supported on a sintered glass disc fused into the reactor tube. The whole system was jacketed in the steel heating jacket described in Example 1 and heated to give a catalyst temperature of 330° C. Pre-mixed methanol and phenol in 1.5:1 molar ratio was vaporised and the vapors fed upwards through the sintered plate and into the catalyst which immediately expanded and became fluidised. The products taken off at the reactor head were condensed and collected as in previous examples before being analysed by conventional means. The feed rate of the methanol/phenol mixture was adjusted to give a contact time with the catalyst of 10 seconds. The products from this experiment represented 93.6% by weight of the feed, 20% of the phenol having been converted to methylated products. The molar yields of these products were as follows:

| | Percent |
| --- | --- |
| Anisole | 2.7 |
| o-Cresol | 68.0 |
| m-Cresol | 1.8 |
| p-Cresol | 10.4 |
| 2,4-xylenol | 9.9 |
| 2,6-xylenol | 7.2 |

TABLE VI

| Run Number | 1 | 2 | 3 | 4 | 5 | 6 |
| --- | --- | --- | --- | --- | --- | --- |
| Catalyst temperature (° C.) | 300 | 330 | 350 | 300 | 330 | 350 |
| Molar methanol:phenol ratio | 0.5:1.0 | 0.5:1.0 | 0.5:1.0 | 1.0:1.0 | 1.0:1.0 | 1.0:1.0 |
| Contact time (sec.) | 10 | 10 | 10 | 10 | 10 | 10 |
| Recovery of liquid products, percent | 97.8 | 100.0 | 99.6 | 98.3 | 95.7 | 95.6 |
| Analysis of the phenol-based products, percent: | | | | | | |
| Anisole | 1.7 | 1.8 | 2.0 | 2.3 | 3.4 | 1.7 |
| Phenol plus o-methylanisole | 84.5 | 70.1 | 62.3 | 76.6 | 58.1 | 51.9 |
| m-/p-Methylanisoles | | 0.9 | 0.8 | 0.7 | 1.9 | 0.8 |
| o-Cresol | 8.5 | 13.6 | 17.6 | 11.6 | 20.6 | 20.5 |
| m-Cresol | 1.2 | 2.4 | 2.6 | 1.7 | 2.7 | 2.4 |
| p-Cresol | 4.2 | 7.8 | 8.6 | 5.8 | 7.3 | 5.7 |
| 2,5-xylenol | | | 0.6 | | | 1.3 |
| 2,4-xylenol | | 3.3 | 4.5 | 1.4 | 5.9 | 8.0 |
| 2,6-xylenol | | | 0.8 | | | 2.9 |
| 2,3-xylenol | | | | | | 0.7 |
| 3,4-xylenol | | | | | | 1.4 |
| 2,4,5-trimethylphenol | | | | | | 1.2 |
| 2,4,6-trimethylphenol | | | | | | 1.6 |

As can be seen from the above table the principal effect of increasing the catalyst temperature is to increase the conversion of phenol, but a secondary effect is to increase the complexity of the product. Where good conversions of phenol are required along with relatively simple products it is preferable to use a temperature of about 330° C. with the catalyst described above, particularly where the higher methanol:phenol ratios are in use.

EXAMPLE 7

A microspheroidal titanium dioxide catalyst (Catalyst E) of mean particle size about 30 microns was placed in a vertical 1" internal diameter glass reactor where This example illustrates that the methylation of phenol over titanium dioxide catalysts may be performed in a fluidised system to give good yields of o-cresol and other methylated products. The particular advantage of this system lies in the ease with which the heat of the methylation reaction may be dissipated from the catalyst thus avoiding the known deleterious effects of poor temperature control on this type of reaction.

EXAMPLE 8

An experiment of three hours duration was performed in which ethanol was the aliphatic alcohol used. The reactor described in Example 1 was charged with a fresh sample of Catalyst C (of Example 2) and through it was passed a feed consisting of a solution of phenol in an equivalent amount of ethanol, the feed rate being adjusted to give a contact time of ten seconds with the catalyst. The catalyst temperature was 330° C. The recovery of liquid product was 98.3% and virtually no gaseous product was formed. The liquid product was dissolved in benzene and dried azeotropically, and the phenol-based material obtained after removal of the benzene by distillation was analyzed by known means and found to contain:

| | Percent |
|---|---|
| Anisole | 0.8 |
| Phenetole | 9.9 |
| Phenol | 37.8 |
| o-Ethylphenetole | 0.3 |
| o-Cresol | 2.2 |
| p-Cresol | 0.3 |
| o-Ethylphenol | 36.2 |
| m-Ethylphenol | 0.9 |
| p-Ethylphenol | 2.4 |
| 2,6-diethylphenol | 3.5 |
| 2,4-diethylphenol | 3.7 |
| Unidentified components | 2.0 |

What is claimed is:

1. A method for the preparation of alkylphenols comprising reacting in the vapor phase over a titanium dioxide catalyst and at a temperature of from 250° C. to 500° C. an alcohol selected from the group consisting of methanol and ethanol with monohydroxybenzene.

2. A process according to claim 1, in which the titanium dioxide catalyst is prepared by drying and calcining a hydrated titanium oxide.

3. A process according to claim 1, in which the reaction is carried out in a fluidized bed reactor.

4. A process according to claim 3, in which the catalyst is in the form of microspheres prepared by the spray drying of a titanium hydroxide sol.

References Cited

UNITED STATES PATENTS

| 2,448,942 | 9/1948 | Winkler et al. | 260—621 |
| 3,267,152 | 8/1966 | Hokama | 260—624 X |

LEON ZITVER, Primary Examiner

N. P. MORGENSTERN, Assistant Examiner

U.S. Cl. X.R.

23—202 R; 252—461; 260—612 D, 624 C